(12) United States Patent
Chen et al.

(10) Patent No.: US 7,583,470 B1
(45) Date of Patent: Sep. 1, 2009

(54) DISK DRIVE WRITING WEDGE RRO DATA ALONG A SINUSOIDAL PATH TO COMPENSATE FOR READER/WRITER OFFSET

(75) Inventors: Teddy T.C. Chen, Huntington Beach, CA (US); Guoxiao Guo, Foothill Ranch, CA (US); Kuang-Yang Tu, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/847,110

(22) Filed: Aug. 29, 2007

(51) Int. Cl.
*G11B 5/596* (2006.01)
(52) U.S. Cl. .................. 360/77.04; 360/77.06
(58) Field of Classification Search .......... None
See application file for complete search history.

(56) References Cited

U.S. PATENT DOCUMENTS

| | | | |
|---|---|---|---|
| 5,668,679 | A | 9/1997 | Swearingen et al. |
| 5,751,512 | A | 5/1998 | Anderson |
| 5,946,157 | A | 8/1999 | Codilian et al. |
| 5,991,115 | A | 11/1999 | Chainer et al. |
| 5,998,994 | A | 12/1999 | Mori |
| 6,023,389 | A | 2/2000 | Cunningham |
| 6,049,440 | A | 4/2000 | Shu |
| 6,061,201 | A | 5/2000 | Woods |
| 6,091,564 | A | 7/2000 | Codilian et al. |
| 6,141,175 | A | 10/2000 | Nazarian et al. |
| 6,304,407 | B1 | 10/2001 | Baker et al. |
| 6,317,285 | B1 | 11/2001 | Bi et al. |
| 6,411,453 | B1 | 6/2002 | Chainer et al. |
| 6,421,197 | B1 | 7/2002 | Abdelnour |
| 6,429,989 | B1 | 8/2002 | Schultz et al. |
| 6,493,173 | B1 | 12/2002 | Kim et al. |
| 6,507,450 | B1 | 1/2003 | Elliott |
| 6,510,017 | B1 | 1/2003 | Abdelnour |
| 6,519,107 | B1 | 2/2003 | Ehrlich et al. |
| 6,545,835 | B1 | 4/2003 | Codilian et al. |
| 6,580,579 | B1 | 6/2003 | Hsin et al. |
| 6,654,198 | B2 | 11/2003 | Liu et al. |
| 6,657,810 | B1 | 12/2003 | Kupferman |
| 6,671,119 | B2 | 12/2003 | Baumann et al. |

(Continued)

FOREIGN PATENT DOCUMENTS

JP  2000268516 A  9/2000

OTHER PUBLICATIONS

U.S. Appl. No. 11/165,638, filed Jun. 23, 2005, 18 pages.

(Continued)

*Primary Examiner*—Jason C Olson
(74) *Attorney, Agent, or Firm*—Howard H. Sheerin, Esq.

(57) ABSTRACT

A disk drive is disclosed including a disk having a plurality of tracks, wherein each track comprises a plurality of servo sectors. The disk drive further comprises a head having a read element offset from a write element by a reader/writer offset. The read element is positioned over a first track and the write element is positioned over a second track. A first servo control signal is generated for servoing the head in response to the servo sectors in the first track, and first wedge repeatable runout (RRO) data is written to the second track along a substantially sinusoidal path corresponding to the reader/writer offset, wherein the first wedge RRO data are for writing data to a third track.

19 Claims, 6 Drawing Sheets

U.S. PATENT DOCUMENTS

| | | | |
|---|---|---|---|
| 6,704,156 B1 | 3/2004 | Baker et al. |
| 6,707,635 B1 | 3/2004 | Codilian et al. |
| 6,738,205 B1 | 5/2004 | Moran et al. |
| 6,754,030 B2 | 6/2004 | Seng et al. |
| 6,775,091 B1 | 8/2004 | Sutardja |
| 6,831,803 B2 | 12/2004 | Hsin |
| 6,859,341 B2 | 2/2005 | Min et al. |
| 6,924,959 B1 | 8/2005 | Melkote et al. |
| 6,947,248 B2 | 9/2005 | Allen et al. |
| 6,963,465 B1 | 11/2005 | Melkote et al. |
| 6,963,466 B2 | 11/2005 | Baum et al. |
| 6,965,491 B1 | 11/2005 | Perlmutter et al. |
| 6,972,922 B1 | 12/2005 | Subrahmanyam et al. |
| 6,977,792 B1 | 12/2005 | Melrose et al. |
| 6,985,316 B1 | 1/2006 | Liikanen et al. |
| 6,999,266 B1 | 2/2006 | Schmidt |
| 7,027,256 B1 * | 4/2006 | Subrahmanyam et al. | 360/77.08 |
| 7,088,547 B1 | 8/2006 | Wang et al. |
| 7,089,353 B2 | 8/2006 | Chainer et al. |
| 7,099,105 B2 | 8/2006 | Ehrlich |
| 7,106,542 B1 | 9/2006 | Sun et al. |
| 7,106,547 B1 | 9/2006 | Hargarten et al. |
| 7,119,981 B2 | 10/2006 | Hanson et al. |
| 7,123,433 B1 * | 10/2006 | Melrose et al. | 360/77.04 |
| 7,130,146 B2 | 10/2006 | Ehrlich |
| 7,133,243 B2 | 11/2006 | Hirano et al. |
| 7,139,149 B1 | 11/2006 | Sun et al. |
| 7,149,043 B2 | 12/2006 | Ehrlich |
| 7,177,110 B2 | 2/2007 | Ehrlich et al. |
| 7,180,696 B2 | 2/2007 | Ehrlich |
| 7,193,808 B2 | 3/2007 | Takaishi |
| 7,193,809 B1 | 3/2007 | Allen |
| 7,199,962 B1 | 4/2007 | Ehrlich |
| 7,304,819 B1 * | 12/2007 | Melkote et al. | 360/77.04 |
| 2002/0015253 A1 | 2/2002 | Litvinov et al. |
| 2002/0036858 A1 | 3/2002 | Bi et al. |
| 2003/0197968 A1 | 10/2003 | Sacks et al. |
| 2003/0210060 A1 | 11/2003 | Schmid |
| 2004/0061967 A1 | 4/2004 | Lee et al. |
| 2004/0123025 A1 | 6/2004 | Chainer et al. |
| 2005/0264917 A1 | 12/2005 | Yano et al. |
| 2007/0047133 A1 | 3/2007 | Allen |
| 2008/0002280 A1 | 1/2008 | Asakura |

OTHER PUBLICATIONS

Office Action dated Feb. 5, 2007 from U.S. Appl. No. 11/165,638, 8 pages.

Notice of Allowance dated Aug. 15, 2007 from U.S. Appl. No. 11/165,368, 7 pages.

Tan et al., "Signal Processing for Perpendicular Recording Channels With Intertrack Interference", IEEE Transactions on Magnetics, Feb. 2005, pp. 730-735, vol. 41, No. 2.

Notice of Allowance dated Sep. 20, 2007 from U.S. Appl. No. 11/165,638, 11 pages.

* cited by examiner

DATA TRACK

FIG. 3B

WRITE SERVO TRACK

WEDGE RRO DATA

FIG. 3C

WRRO SERVO TRACK

DISK DRIVE WRITING WEDGE RRO DATA ALONG A SINUSOIDAL PATH TO COMPENSATE FOR READER/WRITER OFFSET

BACKGROUND

1. Field

The present invention relates to disk drives for computer systems. In particular, the present invention relates to a disk drive writing wedge RRO data along a sinusoidal path to compensate for reader/writer offset.

2. Description of the Related Art

Disk drives comprise a disk and a head connected to a distal end of an actuator arm which is rotated about a pivot by a voice coil motor (VCM) to position the head radially over the disk. The disk typically comprises a number of concentric data tracks each partitioned into a number of data sectors. Access operations are performed by seeking the head to a target data track, and performing a write/read operation on the data sectors within the data track. The disk typically comprises embedded servo sectors having position information recorded therein, such as coarse position information (e.g., a track address) and fine position information (e.g., servo bursts). A servo controller processes the servo sectors to position the head over the target data track.

The embedded servo sectors may be written to the disk using any suitable technique, such as with an external servo writer, a media writer, or self-servo written. An external servo writer writes the servo sectors by servoing the actuator arm (with a pin) while using the head internal to the disk drive to write the servo sectors, whereas a media writer writes the servo sectors onto a number of disks which are then inserted into production disk drives. Alternatively, each disk drive may self-servo write the servo sectors using any suitable technique, such as propagation or while following seed tracks, such as spiral tracks.

Regardless as to how the servo sectors are written, errors in the servo writing process typically means the servo sectors will define eccentric tracks. In addition, eccentricity may be due to the disk being clamped to the spindle motor after being servo written with a media writer, or if the disk slips after being clamped to the spindle motor. The eccentricity is referred to as repeatable runout (RRO) since the position error relative to the head will repeat each time the disk rotates. The RRO typically comprises a component based on the rotational frequency of the disk (fundamental or 1F frequency) as well as higher frequency components unique to each track.

To compensate for the eccentricity, RRO compensation values are generated and processed by the servo controller to either cancel or follow the eccentricity. RRO values corresponding to the fundamental frequency (and optionally the harmonics) are typically learned and then modeled with a sinusoid. The RRO values that correspond to the higher frequency components are typically generated for each track and then written at the end of each servo sector (referred to as wedge RRO data). As the servo controller reads each servo sector, an RRO compensation is generated using the sinusoid RRO value and the wedge RRO data. Therefore, it is important that the wedge RRO data be read reliably to ensure robust RRO compensation.

SUMMARY OF THE EMBODIMENTS OF THE INVENTION

An embodiment of the present invention comprises a disk drive including a disk having a plurality of tracks, wherein each track comprises a plurality of servo sectors. The disk drive further comprises a head having a read element offset from a write element by a reader/writer offset. The read element is positioned over a first track and the write element is positioned over a second track. A first servo control signal is generated for servoing the head in response to the servo sectors in the first track, and first wedge repeatable runout (RRO) data is written to the second track along a substantially sinusoidal path corresponding to the reader/writer offset, wherein the first wedge RRO data are for writing data to a third track.

In one embodiment, the first servo control signal for servoing the head is generated by generating first jog adjustment values to cause the write element to travel in the substantially sinusoidal path. In one embodiment, a position error signal (PES) is generated in response to the servo sectors in the first track and the first jog adjustment values to cause the write element to travel in the substantially sinusoidal path, wherein the PES is filtered with a servo compensator. In another embodiment, the first jog adjustment values comprise feedforward compensation values, and in one embodiment, a position error signal (PES) is generated in response to the servo sectors in the first track and the feedforward compensation values, wherein the PES is filtered by a servo compensator.

In another embodiment, the read element is positioned over the second track, second jog adjustment values are generated to cause the read element to follow the substantially sinusoidal path, and a second servo control signal is generated for servoing the head in response to the second jog adjustment values, the servo sectors in the second track, and the first wedge RRO data in the second track while writing data to the third track.

In still another embodiment, the first jog adjustment values are generated in response to NF RRO values and the reader/writer offset. In one embodiment, the reader/writer offset varies based on the radial position of the head. In another embodiment, the reader/writer offset is estimated by generating a jog slope value in response to the NF RRO values. In one embodiment, the first jog adjustment values are generated by multiplying the NF RRO values by the jog slope value.

In yet another embodiment, second wedge RRO data are written to the disk, wherein the second wedge RRO data are for reading data from the disk, and the second wedge RRO data are written along a substantially circular path.

Another embodiment of the present invention comprises a method of writing wedge RRO data to a disk of a disk drive, the disk drive comprising the disk having a plurality of tracks, wherein each track comprises a plurality of servo sectors. The disk drive further comprises a head comprising a read element offset from a write element by a reader/writer offset. The read element is positioned over a first track and the write element is positioned over a second track. A first servo control signal is generated for servoing the head in response to the servo sectors in the first track, and first wedge repeatable runout (RRO) data is written to the second track along a substantially sinusoidal path corresponding to the reader/writer offset, wherein the first wedge RRO data are for writing data to a third track.

DETAILED DESCRIPTION OF EMBODIMENTS OF THE INVENTION

Figure 1A:
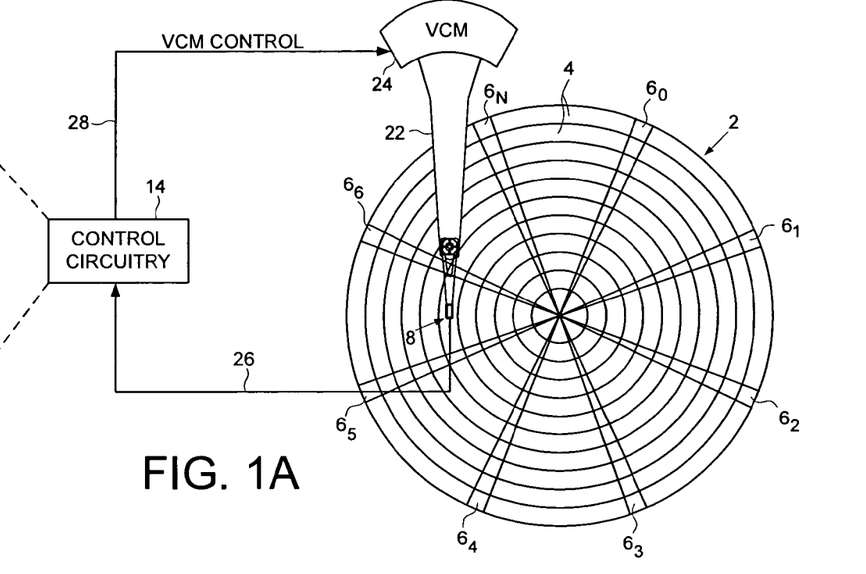
FIG. 1A shows a disk drive according to an embodiment of the present invention comprising a head actuated over a disk having a plurality of tracks with embedded servo sectors.
Figure 1B:
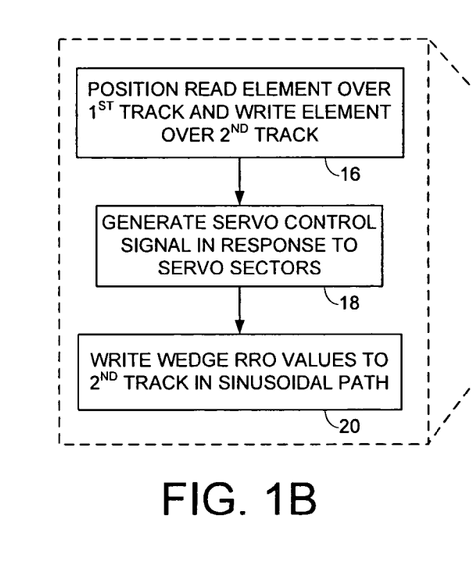
FIG. 1B is a flow diagram executed by control circuitry according to an embodiment of the present invention for writing wedge RRO data along a sinusoidal path corresponding to an effect of NF RRO on the reader/writer offset.
Figure 1C:
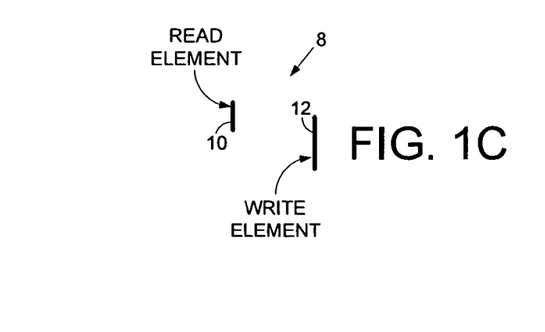
FIG. 1C shows a read head according to an embodiment of the present invention wherein a read element is offset from a write element by radially offset as well as by a gap inline with the actuator arm.

FIG. 1A shows a disk drive including a disk 2 having a plurality of tracks 4, wherein each track comprises a plurality of servo sectors $6_0$-$6_N$. The disk drive further comprises a head 8 having a read element 10 offset from a write element 12 by a reader/writer offset (FIG. 1C). Control circuitry 14 executes the flow diagram of FIG. 1B to write wedge RRO data to the disk 2. The read element 10 is positioned over a first track and the write element 12 is positioned over a second track (step 16). A first servo control signal is generated for servoing the head 8 in response to the servo sectors in the first track (step 18), and first wedge repeatable runout (RRO) data is written to the second track along a substantially sinusoidal path corresponding to the reader/writer offset (step 20), wherein the first wedge RRO data are for writing data to a third track.

In the embodiment of FIG. 1A, the head 8 is connected to a distal end of an actuator arm 22 which is rotated about a pivot by a voice coil motor (VCM) 24. The control circuitry 14 processes the read signal 26 emanating from the head 8 in order to demodulate the servo sectors $6_0$-$6_N$ to generate a servo control signal 28 applied to the VCM 24 in order to actuate the head 8 radially over the disk 2.

The reader/writer offset illustrated in FIG. 1C may be due to a radial offset between the center of the read element 10 and the center of the write element 12 as well as a gap between the read element 10 and the write element 12 inline with the actuator arm 22. The reader/writer gap affects the reader/writer offset due to the skew angle of the head 8 as the head 8 is moved toward the inner or outer diameter of the disk 2. To compensate for the reader/writer offset, a jog value is introduced into the servo system during write and/or read operations.

Figure 2A:
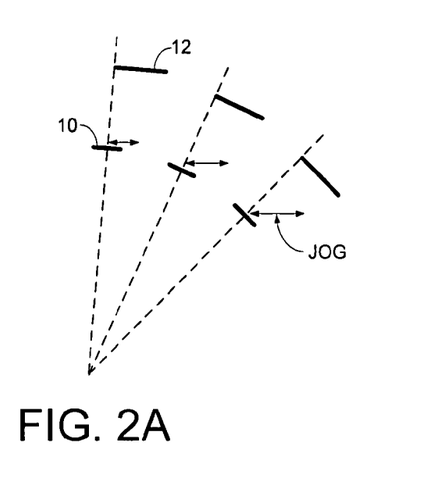
FIG. 2A illustrates how a jog value varies due to the NF RRO of the disk.
Figure 2B:
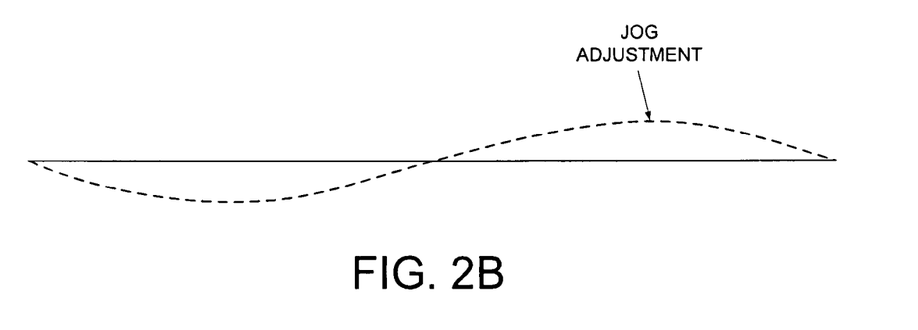
FIG. 2B illustrates how the jog is adjusted to compensate for the effect of the NF RRO.
Figure 3A:
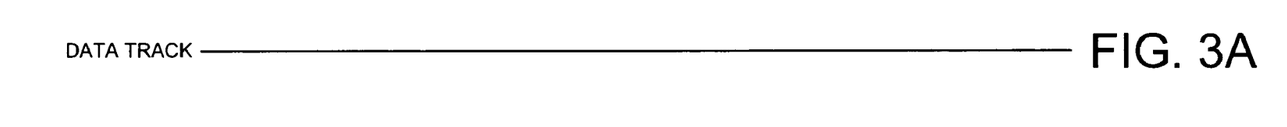
FIGS. 3A-3C illustrate an embodiment of the present invention wherein wedge RRO values are written along a sinusoidal path corresponding to the jog adjustment shown in FIG. 2B.

FIGS. 2A and 2B illustrate the effect of NF RRO (e.g., 1F RRO) on the jog value when the servo system follows the NF RRO using feedforward compensation. As the head 8 moves radially back and forth to follow the NF RRO, the skew angle changes as well as the jog value corresponding to the reader/writer offset as illustrated in FIG. 2A. In order to write data along a substantially circular path corresponding to a data track, the jog value introduced into the servo system is adjusted as shown in FIG. 2B so that the read element will follow a sinusoidal path relative to the servo track during the write operation. This is further illustrated in FIGS. 3A and 3B wherein when the write element 12 is positioned to write data to the data track of FIG. 3A, the read element 10 is positioned over the servo track of FIG. 3B and then servoed in a sinusoidal path relative to the servo track to account for the effect of the NF RRO on the reader/writer offset.

Figures 3B, 3C:
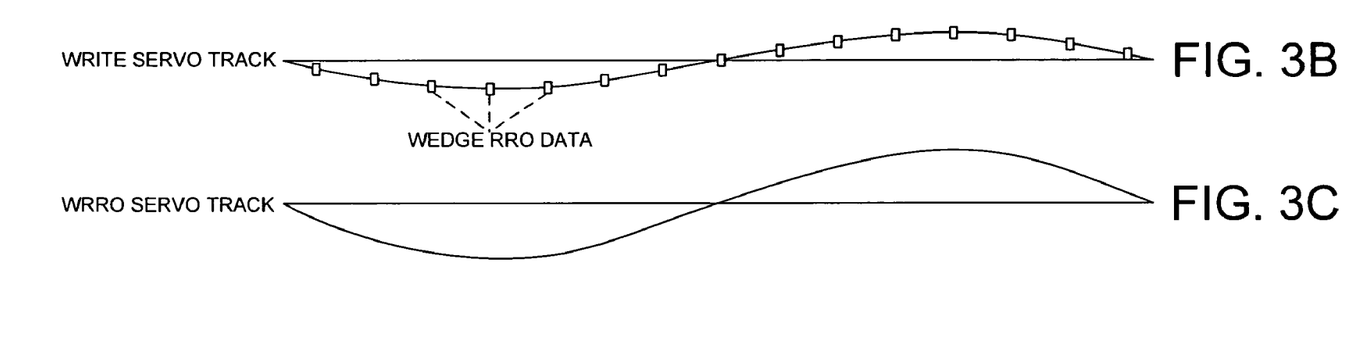

In order to servo the head 8, the control circuitry 14 generates RRO values to compensate for the NF RRO as well as higher frequency RRO by reading wedge RRO data read from the disk. For example, the control circuitry 14 may generate feedforward compensation values so that the read element 10 follows the NF RRO, and then subtract the wedge RRO data from the position error signal (PES) in order to cancel the contribution of the higher frequency RRO from the PES. If the wedge RRO data is written in a substantially circular path (e.g., along the circular servo track), it may be difficult to read the wedge RRO data during write operations since the read element 10 follows the sinusoidal path as shown in FIG. 3B. Therefore, in one embodiment the wedge RRO data is written along the sinusoidal path shown in FIG. 3B so that it can be read reliably during write operations.

When writing the wedge RRO data for the servo track shown in FIG. 3B, the read element 10 is positioned over the servo track of FIG. 3C and then servoed in a sinusoidal path as illustrated. The magnitude of the sinusoidal path of FIG. 3C is approximately twice the sinusoidal path shown in FIG. 3B since there is an additional sinusoidal jog variation due to the effect of the NF RRO when the write element is positioned over the servo track of FIG. 3B and the read element 10 is positioned over the servo track of FIG. 3C. In other words, there is a sinusoidal path associated with the servo track of FIG. 3C that will cause the write element 12 to travel in a circular path (e.g., follow the servo track of FIG. 3B). This sinusoidal path is added to the sinusoidal path shown in FIG. 3B to generate the servo path shown in FIG. 3C to thereby cause the write element 12 to follow the sinusoidal path shown in FIG. 3B while writing the wedge RRO data.

Figure 4:
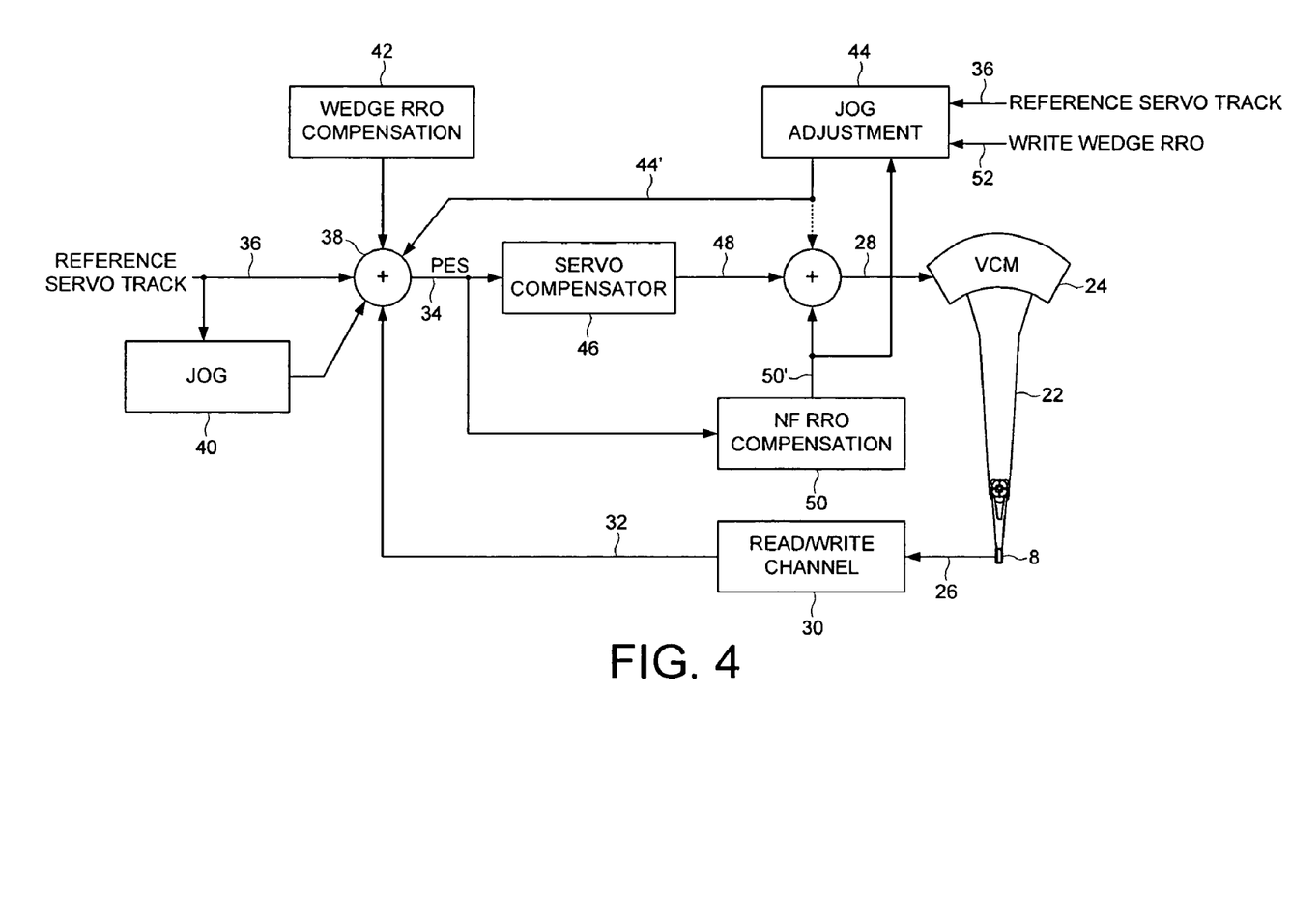
FIG. 4 shows control circuitry according to an embodiment of the present invention wherein jog adjustment values are used to adjust the PES (and optionally as feedforward compensation).

FIG. 4 shows control circuitry 14 according to an embodiment of the present invention for generating the control signal 28 applied to the VCM 24 in order to position the head 8 over the disk 2. As the head 8 reads the servo sectors $6_0$-$6_N$ on the disk 2, a read/write channel 30 demodulates the read signal 26 into an estimated head position 32 relative to the servo sectors $6_0$-$6_N$. A position error signal (PES) 34 is generated by comparing the head position 32 to a reference servo track 36 at adder 38. The PES 34 is adjusted by a jog value 40 which accounts for the reader/writer offset (FIG. 1C). The PES 34 is also adjusted by wedge RRO compensation 42 generated by reading the wedge RRO data recorded in the reference servo track 36 (e.g., to cancel the higher frequency RRO from the PES). During write operations, the PES 34 is modified by a jog adjustment 44 which accounts for the effect of the NF RRO on the jog value 40 as described above. A servo compensator 46 filters the PES 34 using a suitable compensation filter to generate a preliminary control signal 48. The preliminary control signal 48 is adjusted by NF RRO compensation 50 so that the head 8 follows the NF RRO (feedforward compensation). In one embodiment, the NF RRO compensation 50 is generated by evaluating the PES 34 during a calibration procedure using any suitable algorithm.

In one embodiment, the jog adjustment values 44' are added to the jog value 40 so that the PES 34 is adjusted to reflect the change in the jog value as described above with reference to FIGS. 2A and 2B. In an alternative embodiment, the jog adjustment values 44' are combined with the preliminary control signal 48 as feedforward compensation (effectively injecting a sinusoidal disturbance), and the corresponding effect is subtracted from the PES 34 (canceled from the PES 34 similar to the wedge RRO compensation values 42). When writing the wedge RRO data to a servo track (as shown in FIGS. 3B and 3C), a control signal 52 configures the jog adjustment 44 to adjust the jog value 40 so that the read element 10 follows the desired sinusoidal path (FIG. 3C).

The jog adjustment values 44' may be generated using any suitable algorithm. In one embodiment, the jog adjustment values 44' are generated in response to the NF RRO values 50' and the reader/writer offset. In one embodiment, the jog adjustment values 44' are generated according to:

$$k*RW\_Offset*NF\_RRO$$

where k is a suitable scalar that may vary based on the radial location of the head 8. In one embodiment, the reader/writer offset (RW_Offset) is estimated by generating a jog slope value in response to the NF RRO values. The jog slope value represents the change in the jog value due to the NF RRO and is generated according to:

$$jog\ slope=[jog(reference\_track-RRO)-jog(reference\_track+RRO)]/2*RRO$$

where RRO in the above equation represents the magnitude of the NF RRO sinusoid at the reference track.

Figure 5:
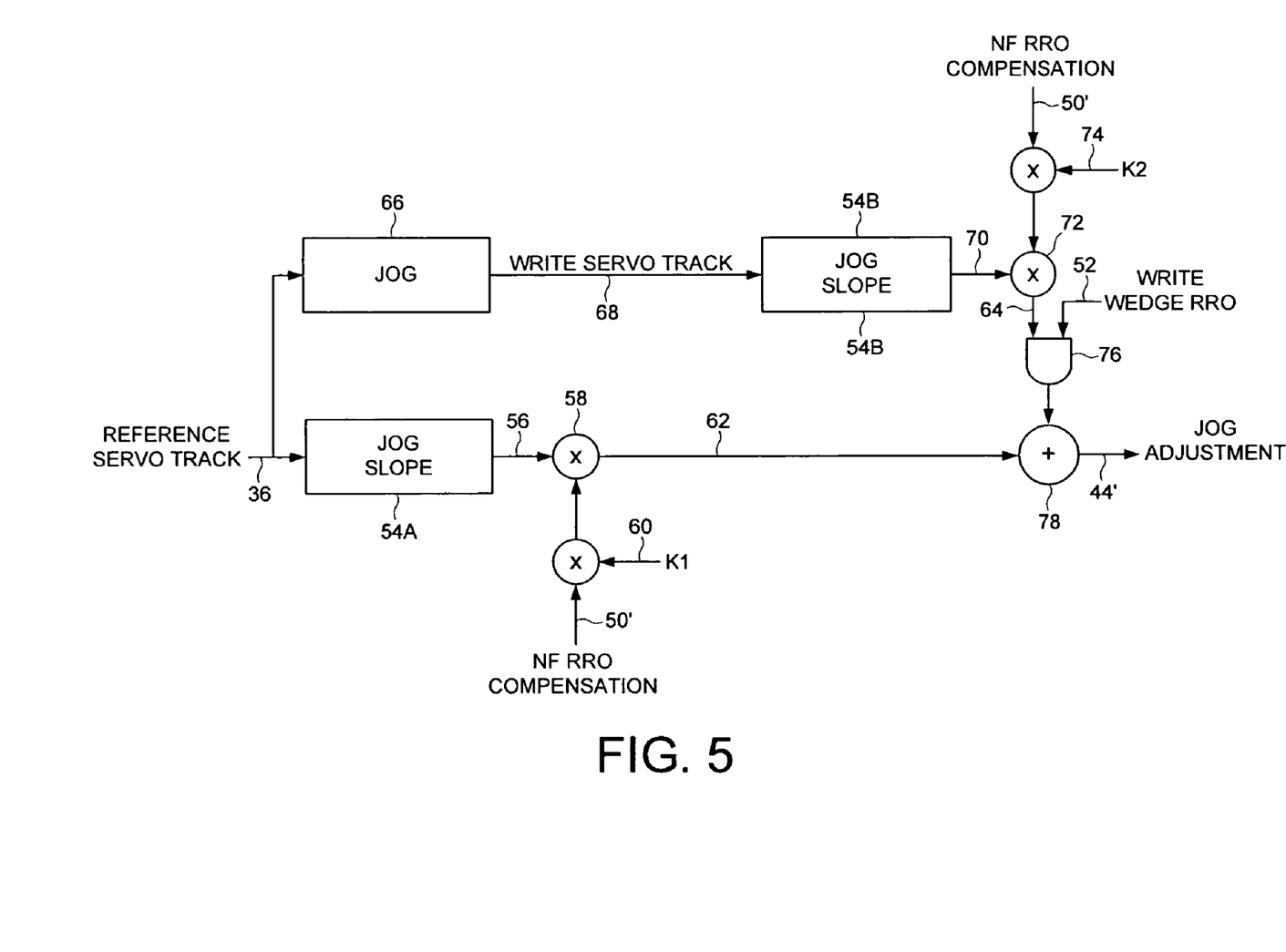
FIG. 5 shows control circuitry according to an embodiment of the present invention for generating the jog adjustment values in response to a jog slope and the NF RRO values.

FIG. 5 shows example control circuitry 14 for generating the jog adjustment values 44'. The reference servo track 36 is input into a jog slope generator 54A which computes a jog slope 56 according to the above equation. The jog slope 56 is multiplied 58 by the NF RRO values 50' adjusted by a scalar k1 60. When writing the wedge RRO data to a servo track (e.g., servo track shown in FIG. 3B), the jog adjustment value 62 is added to a jog adjustment value 64 generated for the servo track to be written. That is, the reference servo track 36 is input into a jog table 66 to determine the write servo track 68 which is input into a jog slope generator 54B to generate a jog slope value 70 corresponding to the write servo track 68. The jog slope value 70 is multiplied 72 by the NF RRO values 50' adjusted by a scalar k2 74. In one embodiment, the scalars k1 and k2 are different values to account for the different radial locations of the head 8. An AND gate 76 is enabled by the write wedge RRO control signal 52 so that the jog adjustment 64 for the write servo track 68 is added 78 to the jog adjustment value 62 generated for the reference servo track 36.

Figure 6A:
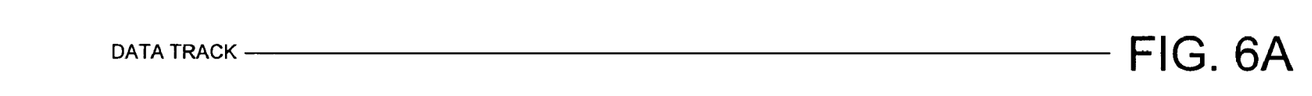
FIGS. 6A-6C illustrate an embodiment of the present invention wherein write wedge RRO data are written along a sinusoidal path and read wedge RRO data are written along a substantially circular path corresponding to a data track.
Figures 6B, 6C:
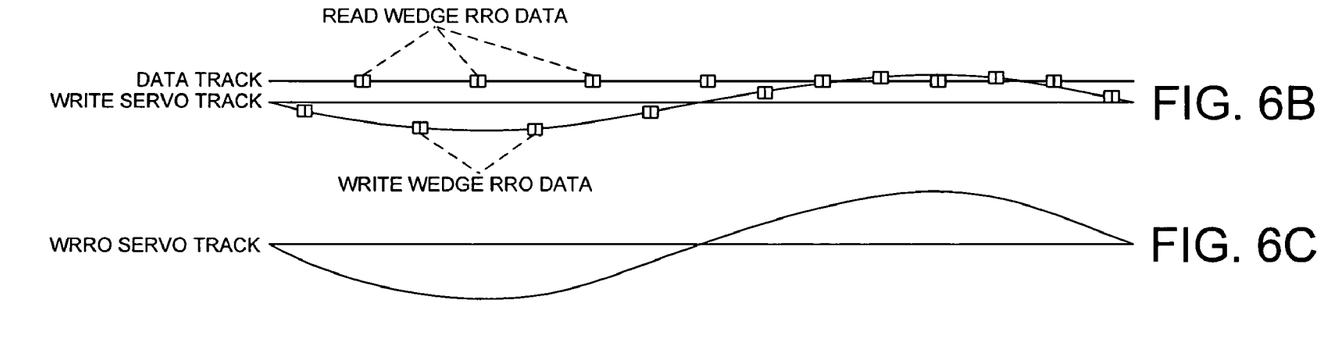

FIGS. 6A-6C illustrate an embodiment of the present invention wherein the control circuitry 14 is further operable to write second wedge RRO data to the disk 2 for reading data from the disk. The second wedge RRO data are written along a substantially circular path, and in the embodiment shown in FIG. 6B, the second wedge RRO data are written along a data track. During a read operation, the read element 10 is positioned over the data track, and the second wedge RRO data (read wedge RRO data) is read from the data track and used to generate the wedge RRO compensation 42 of FIG. 4. The jog adjustment value is set to zero since the read element 10 follows the substantially circular path of the data track during a read operation.

The wedge RRO data (read and/or write) may be written to the disk at any suitable location. In one embodiment, the wedge RRO data are written just after each servo sector $6_0$-$6_N$ and used to adjust the PES 34 for the following servo sector. In another embodiment, the wedge RRO data are written just prior to each servo sector $6_0$-$6_N$. In addition, the wedge RRO data may be written at any suitable data rate, such as the user data rate or at the servo data rate.

Any suitable technique may be employed to learn the wedge RRO data for each track, and any suitable technique may be employed to learn the NF RRO, such as generating coefficients of a sinusoid that models the NF RRO. The NF RRO may comprise any suitable frequency components, such as the fundamental frequency (1F RRO) and/or its harmonics (2F, 3F, etc.).

Any suitable control circuitry 14 may be employed in the embodiments of the present invention, such as any suitable integrated circuit or circuits. For example, the control circuitry 14 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 14 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 2 and read into a volatile semiconductor memory when the disk drive is powered on. In yet another embodiment, the control circuitry 14 comprises suitable logic circuitry, such as state machine circuitry.

What is claimed is:

1. A disk drive comprising:
   a disk comprising a plurality of tracks, wherein each track comprises a plurality of servo sectors comprising repeatable runout (RRO);
   a head comprising a read element offset from a write element by a reader/writer offset; and
   control circuitry operable to:
      position the read element over a first track and the write element over a second track;
      generate a first servo control signal for servoing the head in response to the servo sectors in the first track; and
      write first wedge RRO data to the second track along a substantially sinusoidal path corresponding to the reader/writer offset, wherein the first wedge RRO data are for writing data to a third track,
   wherein:
      the control circuitry is further operable to generate the first servo control signal for servoing the head by generating first jog adjustment values to cause the write element to travel in the substantially sinusoidal path;
      the control circuitry generates the first jog adjustment values in response to NF RRO values and the reader/writer offset; and
      the NF RRO values represent at least one of a fundamental frequency and a harmonic frequency of the RRO.

2. The disk drive as recited in claim 1, wherein the control circuitry is further operable to generate the first servo control signal for servoing the head by:
  generating a position error signal (PES) in response to the servo sectors in the first track and the first jog adjustment values to cause the write element to travel in the substantially sinusoidal path; and
  filtering the PES with a servo compensator.

3. The disk drive as recited in claim 1, wherein the first jog adjustment values comprise feedforward compensation values.

4. The disk drive as recited in claim 3, wherein the control circuitry is further operable to generate the first servo control signal for servoing the head by:
  generating a position error signal (PES) in response to the servo sectors in the first track and the feedforward compensation values; and
  filtering the PES with a servo compensator.

5. The disk drive as recited in claim 1, wherein the control circuitry is further operable to:
  position the read element over the second track;
  generate second jog adjustment values to cause the read element to follow the substantially sinusoidal path;
  generate a second servo control signal for servoing the head in response to the second jog adjustment values, the servo sectors in the second track, and the first wedge RRO data in the second track; and
  write data to the third track.

6. The disk drive as recited in claim 1, wherein the reader/writer offset varies based on the radial position of the head.

7. The disk drive as recited in claim 1, wherein the control circuitry is further operable to estimate the reader/writer offset by generating a jog slope value in response to the NF RRO values.

8. The disk drive as recited in claim 7, wherein the control circuitry is further operable to generate the first jog adjustment values by multiplying the NF RRO values by the jog slope value.

9. The disk drive as recited in claim 1, wherein the control circuitry is further operable to write second wedge RRO data to the disk, wherein:
  the second wedge RRO data are for reading data from the disk; and
  the second wedge RRO data are written along a substantially circular path.

10. A method of writing wedge RRO data to a disk of a disk drive, the disk drive comprising the disk having a plurality of tracks, wherein each track comprises a plurality of servo sectors comprising repeatable runout (RRO), and a head comprising a read element offset from a write element by a reader/writer offset, the method comprising:
  positioning the read element over a first track and the write element over a second track;
  generating a first servo control signal for servoing the head in response to the servo sectors in the first track; and
  writing first wedge RRO data to the second track along a substantially sinusoidal path corresponding to the reader/writer offset, wherein the first wedge RRO data are for writing data to a third track,
  wherein:
    generating the first servo control signal for servoing the head comprises generating first jog adjustment values to cause the write element to travel in the substantially sinusoidal path;
    the first jog adjustment values are generated in response to NF RRO values and the reader/writer offset; and
    the NF RRO values represent at least one of a fundamental frequency and a harmonic frequency of the RRO.

11. The method as recited in claim 10, wherein generating the first servo control signal for servoing the head comprises:
  generating a position error signal (PES) in response to the servo sectors in the first track and the first jog adjustment values to cause the write element to travel in the substantially sinusoidal path; and
  filtering the PES with a servo compensator.

12. The method as recited in claim 10, wherein the first jog adjustment values comprise feedforward compensation values.

13. The method as recited in claim 12, wherein generating the first servo control signal for servoing the head comprises:
  generating a position error signal (PES) in response to the servo sectors in the first track and the feedforward compensation values; and
  filtering the PES with a servo compensator.

14. The method as recited in claim 10, further comprising:
  positioning the read element over the second track;
  generating second jog adjustment values to cause the read element to follow the substantially sinusoidal path;
  generating a second servo control signal for servoing the head in response to the second jog adjustment values, the servo sectors in the second track, and the first wedge RRO data in the second track; and
  writing data to the third track.

15. The method as recited in claim 10, wherein the reader/writer offset varies based on the radial position of the head.

16. The method as recited in claim 10, further comprising estimating the reader/writer offset by generating a jog slope value in response to the NF RRO values.

17. The method as recited in claim 16, wherein the first jog adjustment values are generated by multiplying the NF RRO values by the jog slope value.

18. The method as recited in claim 10, further comprising writing second wedge RRO data to the disk, wherein:
  the second wedge RRO data are for reading data from the disk; and
  the second wedge RRO data are written along a substantially circular path.

19. A disk drive comprising:
  a disk comprising a plurality of tracks, wherein each track comprises a plurality of servo sectors comprising repeatable runout (RRO);
  a head comprising a read element offset from a write element by a reader/writer offset; and
  a means for positioning the read element over a first track and the write element over a second track;
  a means for generating a first servo control signal for servoing the head in response to the servo sectors in the first track; and
  a means for writing first wedge RRO data to the second track along a substantially sinusoidal path corresponding to the reader/writer offset, wherein the first wedge RRO data are for writing data to a third track, wherein:
    generating the first servo control signal for servoing the head comprises generating first jog adjustment values to cause the write element to travel in the substantially sinusoidal path;
    the first jog adjustment values are generated in response to NF RRO values and the reader/writer offset; and
    the NF RRO values represent at least one of a fundamental frequency and a harmonic frequency of the RRO.

* * * * *